United States Patent Office 2,795,208
Patented June 11, 1957

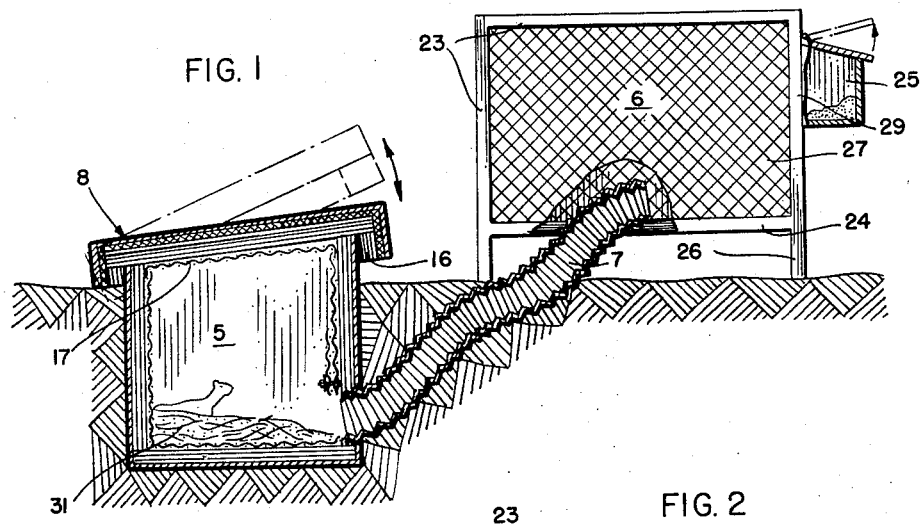
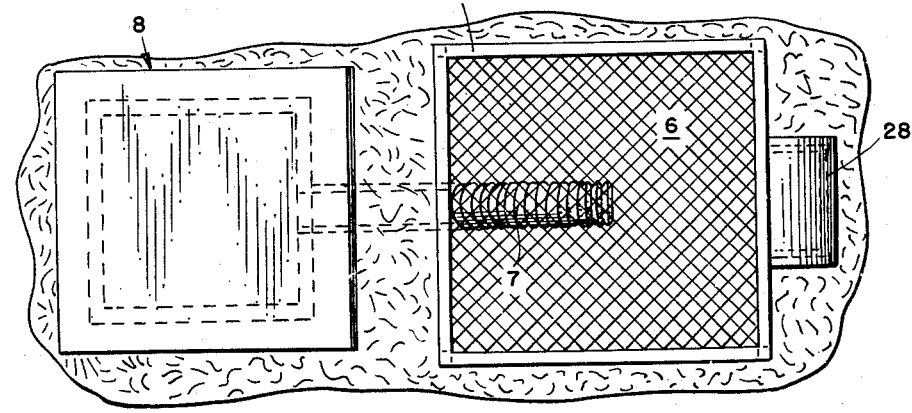
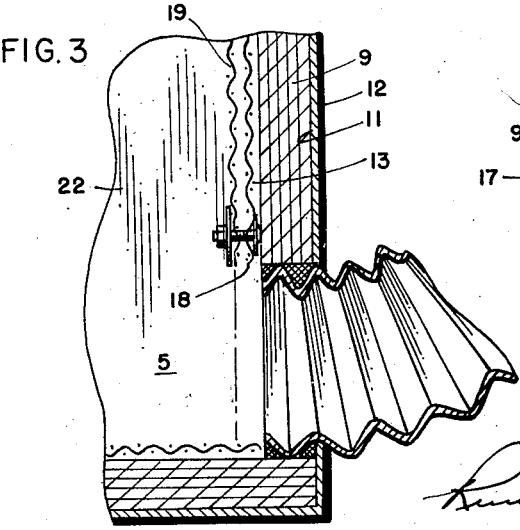
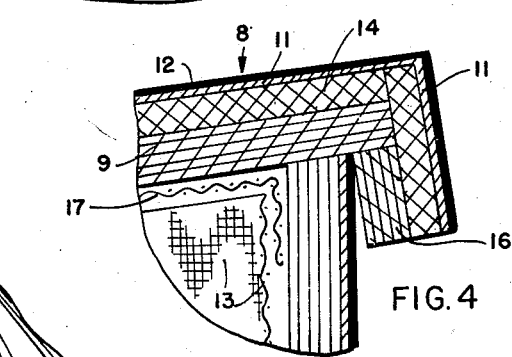

2,795,208

UNDERGROUND AND ABOVE GROUND ANIMAL HOUSING

Alfred E. Rasmussen, Cary, Ill.

Application May 20, 1954, Serial No. 431,046

5 Claims. (Cl. 119—15)

This invention relates to structures for the housing of fur-bearing animals incident to their propagation for their pelts.

The raising of fur-bearing animals for their pelts is confronted with several special requirements. This is especially so in the propagation of minks. Obviously, the animals must be confined in as small an area as is consistent with their fullest and quickest possible maturing. Generally, it is imperative that the animals, and especially the minks, be confined individually in cages impervious to escape. Heretofore minks have been raised in wire cages located above ground where they are subject to the elements. Since minks are normally burrowers, this is an unnatural habitat. On extremely warm days, minks suffer from the heat and run around their cages constantly, thereby making them lean and they produce inferior small pelts. It is advantageous to have a housing that permits the animals at will to alternate between underground and aboveground confines. The underground confine should provide a more or less natural habitat for most of the animal's life and, also, protection from extreme heat and cold and inclement weather conditions involving snow and/or rain. The aboveground confine affords opportunity for the animal's access to food and exposure to air and sunlight when climatic conditions are conducive to that end.

The main objects of this invention are to provide an improved form of animal housing embodying underground and aboveground confines connected by a convenient transit from one confine to the other; to provide an improved animal housing of this kind in which the confines and the transit are separately constructed, one confine being particularly suitable for in-the-ground location and the other confine being particularly suitable for above-the-ground location; to provide an improved underground confine construction completely moisture-proof with easy access thereto for convenient cleaning; to provide an improved form and arrangement of the connecting transit between the two confines; and to provide an improved animal housing of this kind which permits economical manufacture of the two confines and the transit, their convenient shipping from point of production to point of use, and their ready placement and connection by the purchaser.

One specific embodiment of this invention is shown in the accompanying drawings, in which:

Figure 1 is a vertical sectional view of an in-use animal housing constructed in accordance with this invention.

Fig. 2 is a plan view of the same.

Fig. 3 is an enlarged, fragmentary, cross-sectional view of one lower corner of the underground confine and illustrating the connection thereto of one end of the transit; and Fig. 4 is an enlarged, fragmentary, cross-sectional view of one upper corner of the underground confine, illustrating the formation and positioning of the removable cover.

The essential concept of this invention involves a moisture-proofed buriable confine, with a removable basket and retractable cover, and a connecting transit for the animal's convenient movement between the buriable confine to the usual aboveground confine with a feed box.

An animal housing embodying the foregoing concept comprises a confine in the form of a plywood cubicle 5, an aboveground confine in the form of a screen cage 6, and a connecting tube 7.

The cubicle 5 and its removable cover 8 are formed of plywood panels 9, all exterior surfaces of which are overlaid with a metal foil 11 and a moisture-proof coating 12. The cover is provided with a supplementary insulating lining 14.

The plywood panels 9 are cut to appropriate dimensions and secured in a conventional manner to form a stable unit. The metal foil 11, preferably aluminum, is folded around the unit and sprayed with a congealable viscous mixture having an asphalt base. These two layers of metal and hardened asphalt make the cubicle thoroughly moisture-proof.

The cover 8 is formed with a depending perimetrical flange 16 so that it will fit snugly over the open end of the cubicle and extend down a short distance below the perimeter thereof. Also, the cover 8 has the lining 14 of insulating material, such as asbestos, interposed between the outer face of the plywood panel 9 and the overlaid foil and asphalt coating. Such a lining protects the interior of the cubicle from excessive temperatures during the winter or the long hot summer days. Such a cubicle 5 is buried in the ground, as shown in Fig. 1.

A basket 13, formed of coarse-mesh, reasonably heavy wire is made of a size to easily but closely fit within the cubicle. Obviously, the basket 13 is provided with a removable cover 17 to afford access to the interior thereof. At a basket opening 18, registering with the connection of the lower end of the transit 7 to the cubicle 5, is a retractible door 19. As here shown, the door 19 is secured to the basket 13 by a bolt 21 so that the door 19 may be swung in its own plane from its retracted position, as shown in full outline in Figs. 1 and 3, to a position for closing the basket opening 18, as shown in dotted outline in Fig. 3. The bolt 21 has mounted thereon a suitable spring-friction means 22 for yieldingly retaining the door 19 in either of its shifted positions. The obvious function of the basket 13 is to permit removal thereof to allow for cleaning of the cubicle.

The confine 6 is in the form of the usual normal cage now in use and located entirely aboveground. To that end it comprises a suitable framework 23 with a floor 24 disposed above the lower extremities of the corner posts of the framework 23, thus providing cage-supporting legs 26. The framework 23 is covered with coarse-mesh, reasonably heavy wire screening 27. The top would be made removable or swingable so as to permit access to the interior for cleaning. A feed box 28, of suitable proportions, is secured on one side of the cage 6 with a conveniently located opening 29 in the screen 27 affording access for the cage animal to the feed in the box 28.

The transit 7 is here shown in the form of a flexible corrugated tube. The upper end of the tube extends up through and is properly anchored to the bottom 24 of the cage 6. The lower end of the tube is suitably anchored in an opening in one wall of the cubicle 5, adjacent its base. Most of the intermediate portion of the tube is buried in the ground. It will be obvious that the corrugations form a foothold for a small animal using the same.

Such an arrangement of the cubicle and cage confines 5 and 6 and the connecting transit tube 7 provides an ideal housing for animals, and especially where they are being propagated for their pelts.

Ideal conditions for the animal requires facilities such that the animal, responsive to instincts as influenced by climatic circumstances and/or animal organic conditions, may remain underground most of the time in as near as possible a normal habitat, yet afforded a nearly-normal egress from such a habitat to an above-the-ground source of food and/or for occasional basking in warmer atmospheres.

The herein-disclosed, interconnected structures afford just such facilities. Once the animal is placed in these structures, it is free to accommodate itself to underground or above-ground conditions as the overall circumstances require.

Ideal conditions for the rancher require initial low cost for the housing facilities, easy installation thereof, and quick and facile servicing. The form and arrangements of the units herein shown make for a very low cost of production. Their relative location is easily achieved by the purchaser. A multiplicity of units can be closely placed in a limited area of land so that the servicing thereof is facile indeed. A workman may move down a row of cages 6 to replenish and/or clean out the feed boxes 28 or to clean out the confines themselves.

During the growing period of the animals, the cubicles 5 can be quickly cleaned as frequently as is needed. The latter servicing merely requires removing the cover 8 and withdrawing the wire basket 13, after inserting a rod or stick to position the door 19 over the opening 18 to prevent escape of the animal. If desired a rod or stick may be used to stir up the bedding material 31 to free it of droppings, of feces or unconsumed food. With the basket 13 removed the interior of the cubicle may be cleaned. Such cleaning being done, the basket may be easily replaced in the cubicle, the door 19 returned to its retracted position and the cover 8 replaced on the cubicle.

It should obvious that the confine or housing 5 may be made of other material but ideally the confine should be escape and moisture-proof as well as temperature controlled more nearly as possible to which the animal is accustomed in natural state.

Although but one specific embodiment of this invention is herein shown and described, it will be understood that numerous details of the structure shown may be altered or omitted without departing from the spirit of the invention as defined by the following claims:

I claim:

1. An animal housing confine for in-the-ground burial and association with an above-the-ground cage, the confine comprising a solid-wall moisture-proofed cubicle having a removable cover, flexible corrugated moisture-proofed transit tube secured at one of its ends to the cubicle adjacent the base thereof and having its other end free for subsequent attachment to the cage, a removable wire mesh basket within the cubicle and having an opening in one side thereof to register with the transit tube, a door swingable on the basket into and out of position to close the basket opening, and a removable cover for the basket.

2. A combination underground and aboveground animal housing comprising, separately-formed, spaced-apart transit-connected confines, the underground confine being an open-top cubicle with a removable cover and moisture-proofed for in-the-ground burial and having an opening formed in one wall thereof adjacent the bottom, the aboveground confine being a wire-screen-covered framework cage having an opening therein above the base, and a transit in the form of a conduit connected at its ends to the two confines at the respective openings thereof to provide an animal passageway between the confines.

3. A combination underground and aboveground animal housing comprising, separately-formed spaced-apart transit-connected confines, the underground confine being an open-top cubicle with a removable cover and moisture-proofed for in-the-ground burial and having an opening formed in one wall thereof adjacent the bottom, the aboveground confine being a wire-screen-covered framework cage with legs spacing the bottom above ground and having a transit opening in the bottom, and a transit in the form of a flexible conduit connected at its ends to the two confines at the respective openings thereof to provide an animal passageway between the confines.

4. A combination underground and aboveground animal housing comprising, separately-formed spaced-apart transit-connected confines, the underground confine being an open-top cubicle with a removable cover and moisture-proofed for in-the-ground burial and having an opening formed in one wall thereof adjacent the bottom, the aboveground confine being a wire-screen-covered framework cage with legs spacing the bottom above ground and having a transit opening in the bottom, and a transit in the form of a corrugated flexible conduit connected at its ends to the two confines at the respective openings thereof to provide an animal passageway between the confines.

5. A combination underground and aboveground animal housing comprising, separately-formed spaced-apart transit-connected confines, the underground confine being an open-top cubicle with a removable cover and moisture-proofed for in-the-ground burial and having an opening formed in one wall thereof adjacent the bottom, the aboveground confine being a wire-screen-covered framework cage having an opening therein above the base, a flexible corrugated moisture-proofed transit tube secured at one of its ends to the underground cubicle and having its other end attached to the aboveground cubicle opening, a removable wire-mesh basket within the underground cubicle and having an opening in one side thereof to register with the transit tube, a door swingable on the basket into and out of position to close the basket opening, and a removable cover for the basket.

References Cited in the file of this patent
UNITED STATES PATENTS

| | | |
|---|---|---|
| 1,303,736 | Speicher | May 13, 1919 |
| 1,449,428 | McGaffee | Mar. 27, 1923 |
| 1,549,229 | Smithline | Aug. 11, 1925 |
| 1,767,150 | McCassey et al. | June 24, 1930 |
| 1,878,459 | Bliss et al. | Sept. 20, 1932 |
| 1,947,698 | Corbin | Feb. 20, 1934 |
| 2,002,259 | Cole | May 21, 1935 |
| 2,034,156 | Snider | May 17, 1936 |
| 2,249,295 | Lawless | July 15, 1941 |
| 2,324,339 | Vanbussum | July 13, 1943 |
| 2,506,057 | Bergstein | May 2, 1950 |
| 2,555,380 | Stuart et al. | June 5, 1951 |

OTHER REFERENCES

Popular Mechanics, August 1946, page 185.